United States Patent
Rohloff (10) Patent No.: US 9,461,974 B2
(45) Date of Patent: *Oct. 4, 2016

(54) SYSTEM AND METHOD TO MERGE ENCRYPTED SIGNALS IN DISTRIBUTED COMMUNICATION SYSTEM

(71) Applicant: RAYTHEON BBN TECHNOLOGIES CORP., Cambridge, MA (US)

(72) Inventor: Kurt Ryan Rohloff, South Hadley, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/194,597

(22) Filed: Feb. 28, 2014

(65) Prior Publication Data

US 2015/0249650 A1    Sep. 3, 2015

(51) Int. Cl.
| | |
|---|---|
| H04L 29/06 | (2006.01) |
| H04K 1/00 | (2006.01) |
| H04L 9/00 | (2006.01) |
| H04L 9/30 | (2006.01) |

(52) U.S. Cl.
CPC ............. *H04L 63/0471* (2013.01); *H04K 1/00* (2013.01); *H04L 9/008* (2013.01); *H04L 9/3093* (2013.01)

(58) Field of Classification Search
CPC ..... H04L 63/0471; H04L 9/08; H04L 9/008; H04L 9/28; H04L 9/3093; H04L 9/06; H04K 1/00
See application file for complete search history.

(56) References Cited

U.S. PATENT DOCUMENTS

| | | | |
|---|---|---|---|
| 6,477,652 B1 | 11/2002 | Yen et al. | |
| 6,986,044 B1 | 1/2006 | Inada | |
| 7,373,517 B1* | 5/2008 | Riggins | ................. H04L 9/0863 380/44 |
| 8,363,744 B2 | 1/2013 | Agee et al. | |
| 2003/0044017 A1 | 3/2003 | Briscoe | |
| 2003/0163697 A1 | 8/2003 | Pabla et al. | |
| 2009/0063861 A1 | 3/2009 | Chu | |
| 2010/0220856 A1 | 9/2010 | Kruys et al. | |
| 2011/0085665 A1* | 4/2011 | Hong | ..................... H04L 9/0833 380/278 |
| 2011/0293093 A1* | 12/2011 | Sun | ........................ H04L 9/0833 380/211 |
| 2012/0243681 A1* | 9/2012 | Francis | ................. H04L 9/0866 380/44 |
| 2013/0142336 A1 | 6/2013 | Fries et al. | |

(Continued)

OTHER PUBLICATIONS

"Secure Voice over IP (SVoIP) vs. Voice over Secure IP (VOSIP) Installations", General Dynamics, C4 Systems, 2010 (4 pgs.).

(Continued)

*Primary Examiner* — Matthew Smithers
(74) *Attorney, Agent, or Firm* — Lewis Roca Rothgerber Christie LLP (57) ABSTRACT

In a computer implemented method for data privacy in a distributed communication system, the method includes: storing a plurality of secret keys, each secret key for a respective one of a plurality of client terminals; identifying a mixer key; generating a plurality of key switch hints for the client terminals, each of the key switch hints generated for a respective client terminal of the client terminals, using the mixer key and a respective secret key for each respective client terminal; sending the key switch hints to a mixer; switching a first encrypted data stream received from a first client terminal of the client terminals to an encrypted output data stream using the key switch hints; and sending the encrypted output data stream to a receiving client terminal of the client terminals to be decrypted by the receiving client terminal.

20 Claims, 7 Drawing Sheets

(56) References Cited

U.S. PATENT DOCUMENTS

| | | | |
|---|---|---|---|
| 2013/0216044 A1 | 8/2013 | Gentry et al. | |
| 2013/0272521 A1 | 10/2013 | Kipnis et al. | |
| 2013/0318347 A1 | 11/2013 | Moffat | |
| 2014/0334624 A1* | 11/2014 | Bernsen | H04L 9/0833 380/279 |
| 2015/0249649 A1* | 9/2015 | Rohloff | H04L 63/0471 713/153 |

OTHER PUBLICATIONS

Dunte, et al., "Secure Voice-over-IP", IJCSNS International Journal of Computer Science and Network Security, vol. 7, No. 6, Jun. 2007 (pp. 63-68).

Gentry, "A Fully Homomorphic Encryption Scheme", Dissertation Submitted to the Department of Science and the Committee on Graduate Studies of Stanford University in Partial Fulfillment of the Requirements for the degree of Doctor of Philosophy, Sep. 2009 (209 pgs.).

Gentry, "Computing Arbitrary Functions of Encrypted Data", Communications of the ACM, vol. 53, No. 3, Mar. 2010 (pp. 97-105).

Gentry, et al., "A Working Implementation of Fully Homomorphic Encryption", IBM T.J. Watson Research Center, 2009 (5 pgs.).

Halevi, et al., "Design and Implementation of a Homomorphic-Encryption Library", Apr. 11, 2013 (46 pgs.).

Lyubashevsky, et al., "A Toolkit for Ring-LWE Cryptography", May 16, 2013 (51 pgs.).

* cited by examiner

SYSTEM AND METHOD TO MERGE ENCRYPTED SIGNALS IN DISTRIBUTED COMMUNICATION SYSTEM

STATEMENT REGARDING FEDERALLY SPONSORED RESEARCH OR DEVELOPMENT

This invention disclosure is related to a government contract number FA8750-11-C-0098. The U.S. Government has certain rights to this invention.

FIELD

Aspects of embodiments of the present invention relate to a system and method to merge encrypted signals in a distributed communication system.

BACKGROUND

A typical system for enabling multiple entities to exchange data or communicate with one another may include a form of a distributed communication system, in which multiple parties to a communication are connected to each other through a network and a central hub or switch. In many circumstances, where the data being exchanged includes sensitive information, it can be important to maintain privacy from external security threats. Additionally, in some circumstances, the network itself may not be reliably secure or trustworthy. For example, various parties engaging in a Voice over Internet Protocol (VoIP) teleconference may be speaking about sensitive information from various trusted locations throughout the world, but the telecommunication system or the central data mixer used to transmit data between the parties may not be secure or trustworthy. Thus, privacy or security concerns may arise in encrypted communication systems, for example, encrypted VoIP teleconferencing systems, where encryption keys must be shared with the central data mixer.

SUMMARY

In some embodiments, the present invention is directed to a system and method for merging encrypted data without sharing a private key for every teleconference session.

In some embodiments, the present invention is a computer implemented method for data privacy in a distributed communication system, the method including: storing a plurality of secret keys, each secret key for a respective one of a plurality of client terminals; identifying a mixer key; generating a plurality of key switch hints for the client terminals, each of the key switch hints generated for a respective client terminal of the client terminals, using the mixer key and a respective secret key for each respective client terminal; sending the key switch hints to a mixer; switching a first encrypted data stream received from a first client terminal of the client terminals to an encrypted output data stream using the key switch hints; and sending the encrypted output data stream to a receiving client terminal of the client terminals to be decrypted by the receiving client terminal.

In some embodiments, the present invention is a computer implemented method for data privacy in a distributed communication system, the method including: receiving a plurality of key switch hints, each of the plurality of key switch hints corresponding to a respective one of a plurality of client terminals; receiving a first encrypted data stream from a first client terminal of the client terminals; switching the first encrypted data stream using a first key switch hint of the plurality of key switch hints to generate a first encrypted data representation of the first encrypted data stream; and generating an encrypted output data stream based on the first encrypted data representation.

In some embodiments, the present invention is a distributed communication system including a plurality of client terminals communicating through a communication hub, the communication hub including: an input port for receiving a plurality of key switch hints and a plurality of encrypted data streams, wherein each of the key switch hints and each of the encrypted data streams correspond to a respective one of the client terminals; a first switching circuit coupled to the input port for generating an encrypted data representation of each of the encrypted data streams using a corresponding one of the key switch hints; and an output terminal coupled to the switching unit for generating output encrypted data streams based on the encrypted data representation of each of the encrypted data streams.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Aspects of embodiments of the present invention relate to a system and method to merge encrypted signals in a distributed communication system, for example, Voice over Internet Protocol (VoIP) teleconferencing systems, video conferencing systems, control systems, detection systems, or accounting systems.

In some embodiments, the present invention is a system and method for merging encrypted data in a distributed communication system using key switch hints generated by a trusted third party prior to initiating a communication session.

In some embodiments, the present invention provides a system and method for users operating client terminals to engage in privacy-preserving communication sessions, for example, teleconferencing, where communication privacy is maintained despite all communications by the client terminals (or clients) being observed during the communication session, even at a central communication hub (e.g., a teleconference mixer). The client terminals or the users of the client terminals may share secret keys with a trusted third party at a time that is convenient for secure communication, such as with a public key scheme with authentication, rather than when a communication session is about to commence.

In some embodiments, the trusted third party generates its own secret key and key switch hints from its private key and the client terminals' secret keys. The key switch hints are used to delegate decryption capability from the client to the third party and back again. After delegating decryption capability to a common key, resulting ciphertexts can be added together.

Embodiments of the invention may use a suitable encryption technique agreed-upon by each of the client terminals, for example, additive homomorphic encryption, such that all clients have a common private key. Client terminals may encode analog data signals (e.g., a user's voice) into a digital data stream using an additive encoding scheme, and encrypt the encoded digital data stream using a suitable encryption scheme, such as an additive homomorphic encryption scheme. The client terminals may then transmit the encrypted data stream to a central communication hub (e.g., a mixer), where the central communication hub operates to switch the encrypted data stream received from each client terminal into a representation that can be decrypted using the trusted third party private key. The central communication hub may then combine the switched data streams, for example, using an encrypted homomorphic addition. The central communication hub may then switch the combined switched data streams into a form that can be decrypted by an intended receiver using an appropriate key switch hint, and then send the result to the intended recipient. The recipient can then decrypt, decode, and play back the result.

Figure 1:
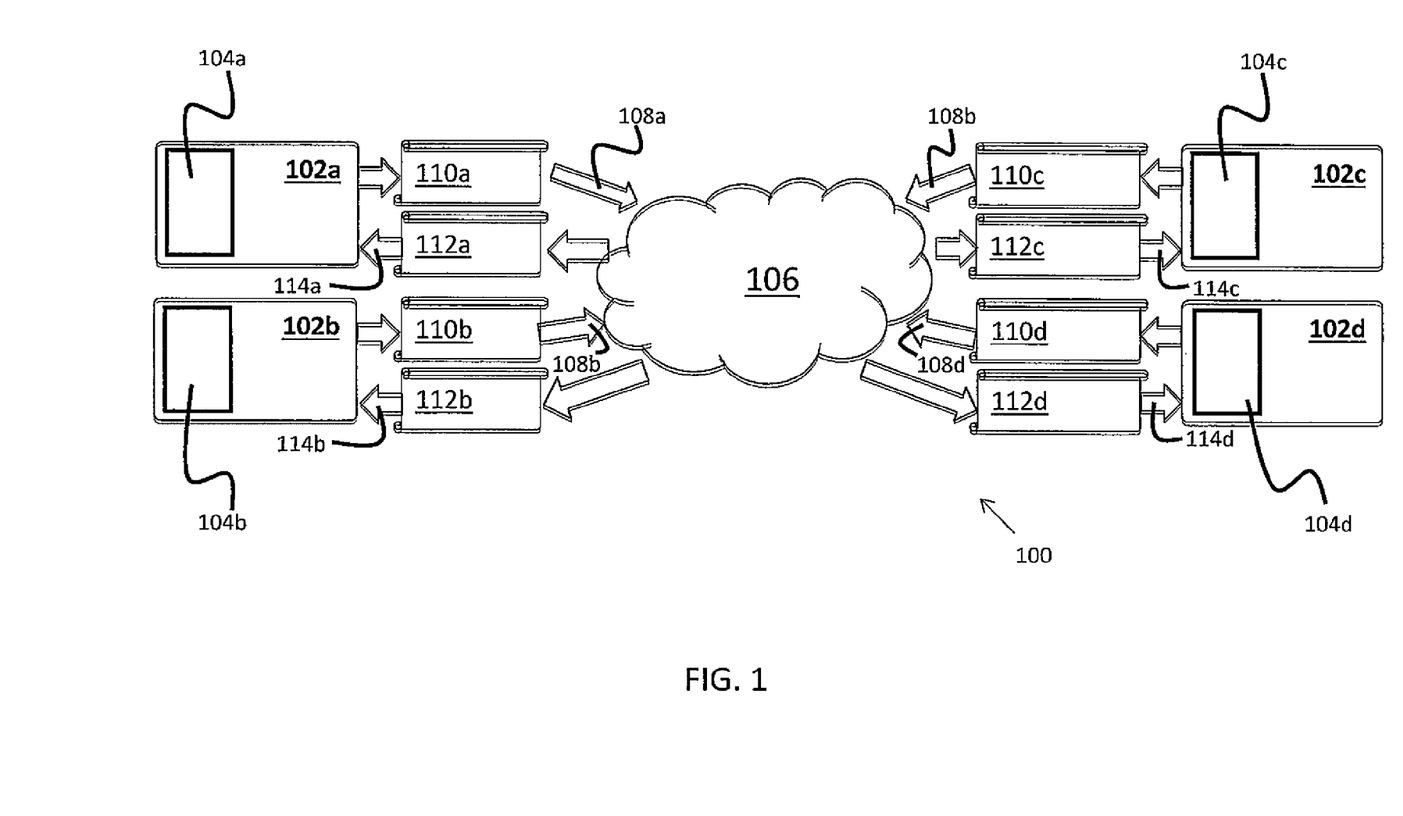
FIG. 1 illustrates a distributed communication system and a plurality of client terminals engaging in electronic communication in the distributed communication system, according to some embodiments of the present invention.

FIG. 1 illustrates a distributed communication system 100 and plurality of entities or clients 102a-102d engaging in electronic communication in a distributed communication system. The number of clients may vary according to the design and function of the communication system 100. Each of the clients 102a-102d includes one or more communication devices 104a-104d, respectively. The communication devices 104a-104d may be any suitable communication device configured to receive and process data communication signals over the distributed communication system 100. In one embodiment, the communication devices 104a-104d include Voice over Internet Protocol (VoIP) enabled telephones, capable of placing and transmitting telephone calls over an IP network (e.g., the Internet).

One or more of the communication devices 104a-104d may also include a cellular telephone, smartphone, tablet computer, personal computer, or other suitable communication device with computing and connectivity capability that is capable of processing digital communications data, and transmitting and receiving digital communications data over a network. In one embodiment, one or more of the communication devices 104a-104d may include a public switched telephone network (PSTN) telephone in electrical communication with an analog telephone adapter capable of converting analog data signals to digital data signals for communication over a digital communication network (e.g., the Internet). In the case of a PSTN telephone communication network, the distributed communication system may further include components capable of encoding, encrypting, and decrypting a digital communication signal for interface with the analog PSTN network. Each of the communication devices 104a-104d may additionally include a microphone and a speaker for receiving and producing audible analog sound for users of the clients 102a-102d.

Each of the client terminals 102a-102d is in electronic communication with a central hub or mixer 106 by way of communication channels 108a-108d, respectively. The central communication hub 106, for example, a mixer, may be any suitable electronic mixer capable of combining two or more electrical or data signals into one or more composite output signals. In one embodiment, the mixer 106 is a VoIP-enabled mixer. The communication channels 108a-108d may be uni-directional or bi-directional and transmit data between the clients 102a-102d and the mixer 106 in a wired or wireless configuration.

During a communication session over the distributed communication network 100, each of the clients 102a-102d receive analog or digital data signals (e.g., audio and video provided by the user of the clients 102a-102d), and provide a digital encrypted version of the analog or digital data signals over the respective communication channels 108a-108d in the form of encrypted data streams 110a-110d. For example, during a VoIP teleconference session, each of the clients 102a-102d may sample analog voice data using the audio capturing capabilities of the respective communication devices 104a-104d, encode the analog samples into digital data packets at regular intervals, and encrypt each of the digital data packets to create the encrypted data streams 110a-110d. The encoded data packets may be encrypted into the encrypted data streams 110a-110d using any suitable encryption scheme or algorithm, such as the NTRU encryption algorithm modified to provide either Somewhat Homomorphic Encryption (SHE) or Fully Homomorphic Encryption (FHE) capabilities.

The mixer 106 receives the encrypted data streams 110a-110d from each of the clients 102a-102d, respectively, and mixes the encrypted data streams 110a-110d according to the design and function of the distributed communication network 100 to generate one or more composite encrypted result data steams 112a-112d. The composite encrypted result data streams 112a-112d may include a composite of all of the encrypted data streams 110a-110d, or may selectively include only a portion of the encrypted data streams 110a-110d. For example, the composite encrypted result data stream 112a, intended to be transmitted to the client 102a, may include a composite of all of the encrypted data streams 110a-110d, or alternatively, may include only a composite of the encrypted data streams 110b-110d, with the encrypted data stream 110a generated by the client terminal 102a not being included in the composite encrypted result data stream 112a, to improve the perceived sound quality for the user of the client terminal 102a.

After generating the composite encrypted result data streams 112a-112d, the mixer 106 transmits the composite encrypted result data streams 112a-112d to each of the client terminals 102a-102d, respectively, by way of communication channels 114a-114d. The communication channels 114a-114d may be uni-directional or bi-directional and transmit data between the mixer 106 and the clients 102a-102d in a wired or wireless configuration. Each of the clients 102a-102d then decrypts the respective composite encrypted result data stream 112a-112d that they receive using private or secret keys held by each of the clients 102a-102d, and if necessary, decodes the decrypted data stream into an analog data stream, and plays the decoded and decrypted data stream using the corresponding communication device 104a-104d.

According to the above process illustrated in FIG. 1, each of the clients 102a-102d transmits an encrypted data stream 110a-110d to the central mixer 106 that is pre-encrypted.

That is, the encryption of the data is not performed by the mixer 106, but instead is performed at the client side of the communication, thereby improving privacy within the distributed communication system 100.

Figure 2:
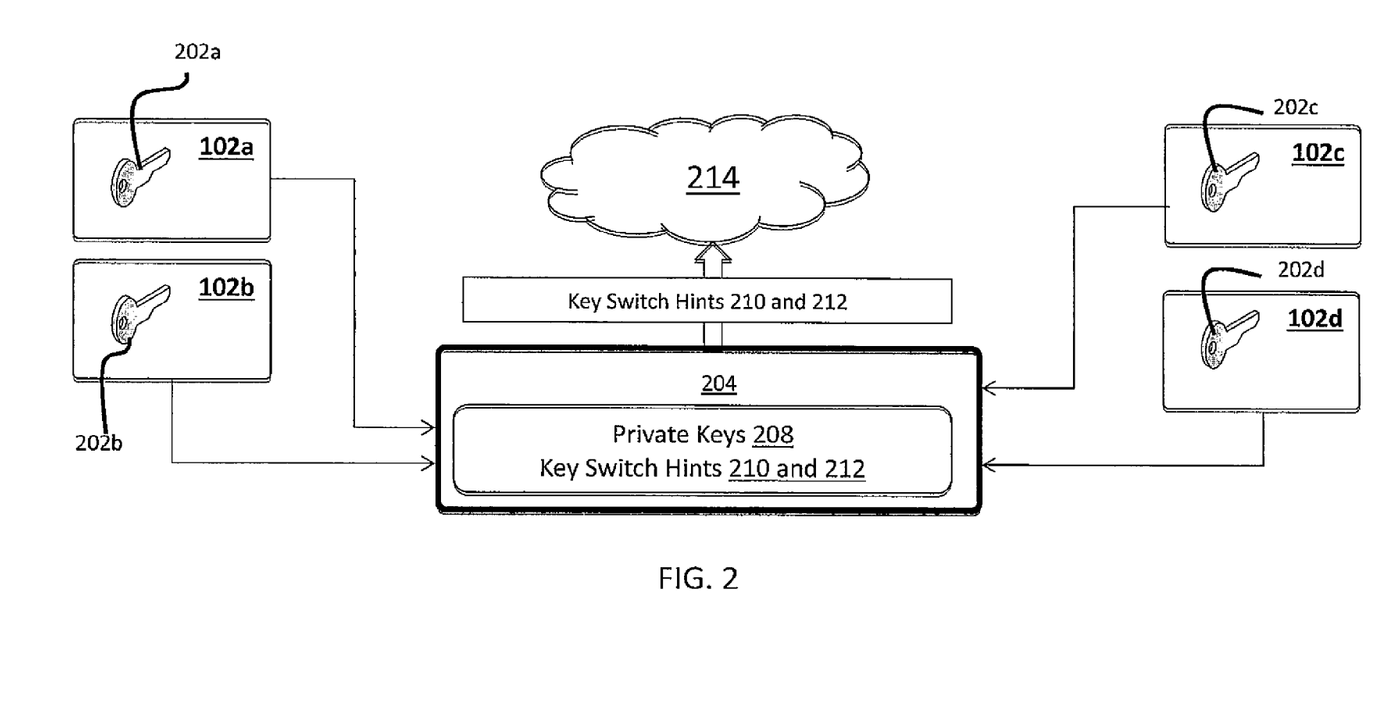
FIG. 2 illustrates a distributed communication system and a system for generating key switch hints for use in the distributed communication system, according to some embodiments of the present invention.

FIG. 2 illustrates an example distributed communication system and a system for generating key switch hints for use in the distributed communication system. Each of the clients 102a-102d generates a secret key 202a-202d for encryption and decryption of data signals according to the characteristics of the distributed communication system 200 and the encryption/decryption algorithm. For example, a given secret key sk for an NTRU-based encryption scheme may have parameters p and q, which are randomly selected by selecting an sk∈R where R is a dimension-n ring such that sk=1 mod p and sk is invertible modulo q. The secret key sk may be represented, for example, as an integer length-n vector.

Prior to initiation of a communication session between the clients 102a-102d, each of the clients 102a-102d provide their respective secret keys 202a-202d to a trusted third party 204, by way of communication channels 206a-206d. The communication channels 206a-206d may be uni-directional or bi-directional and transmit data between the clients 102a-102d in a wired or wireless configuration. The trusted third party 204 may be a computer system or server under the control of an entity that each of the clients 102a-102d agrees, in advance of the communication session, can be trusted. For example, if each of the users of the clients 102a-102d work with a particular company, the company may operate a computer system or server that operates as the trusted third party 204, such that each of the clients 102a-102d provide the secret keys 202a-202d to the trusted third party 204 prior to traveling overseas and engaging in VoIP telephone conferences with each other.

Upon receiving each of the secret keys 202a-202d, the trusted third party 204 generates a private key 208. In some embodiments, the third party 204 selects one of the secret keys 202a-202d to use as the private key 208. Alternatively, the third party 204 may generate the private key 208 based on the secret keys 202a-202d. In some embodiments, the private key 208 may be generated by the third party 204 without regard for the secret keys 202a-202d, for example, using a random number generator, in electronic communication with, incorporated within, or operated by the third party 204.

Additionally, the trusted third party 204 generates a plurality of key switch hints 210 and 212 based on the secret keys 202a-202d provided by each of the clients and the private key 208. Each of the key switch hints 210 operate as client-to-mixer hints, and a client-to-mixer hint 210 is generated to correspond to each of the secret keys 202a-202d received from the clients 102a-102d. Each of the key switch hints 212 operate as mixer-to-client hints, and a mixer-to-client hint 212 is generated to correspond to each of the secret keys 202a-202d received from the clients 102a-102d.

The trusted third party 204 is in electronic communication with a central communication hub or mixer 214 by way of communication channel 216, and after generating the key switch hints 210 and 212, the trusted third party 204 transmits the key switch hints 210 and 212 to the mixer 214 prior to the beginning of a communication session between the clients 102a-102d. Depending on the type of encryption scheme utilized by the distributed communication system 100, the mixer 214 may need to additionally receive information regarding the encryption scheme. Such additional information may be separately provided by the trusted third party 204 to the mixer 214, or may be incorporated or embedded into the key switch hints 210 and 212. For example, in the case of an NTRU-based additive homomorphic encryption scheme, the mixer 214 may additionally provide the ring dimension and the ciphertext modulus to the mixer 214, either embedded within the key switch hints 210 or 212, or in a separate data transmission.

Figure 3:
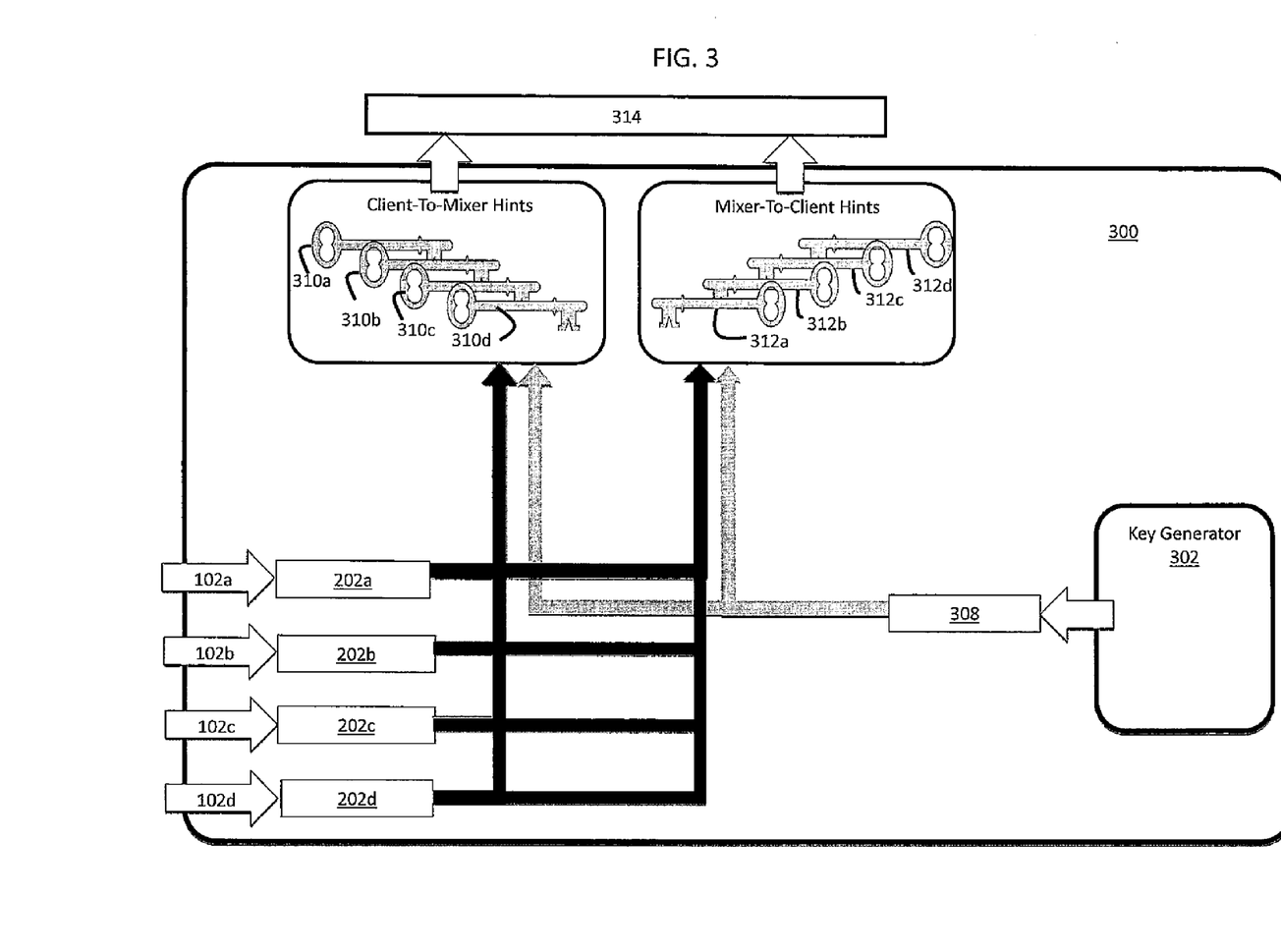
FIG. 3 illustrates a distributed communication system and the operation of a trusted third party, according to some embodiments of the present invention.

FIG. 3 illustrates an example block diagram of a trusted third party 300 according to an embodiment of the present invention. Each client terminal 102a-102d provides a private or secret key 202a-202d, respectively, to the trusted third party 300 prior to initiating a communication session. The trusted third party 204 includes a key generator unit 302, which generates a mixer private key 308. In one embodiment, the mixer private key 208 may be the same as one of the secret keys 202a-202d received from one of the client terminals 102a-102d.

Based on the mixer private key 308 and the secret keys 202a-202d, the trusted third party 300 generates a plurality of client-to-mixer hints 310a-310d corresponding to each of the client terminals 102a-102d, respectively, using a suitable key switch hint generating procedure. Additionally, the trusted third party 300 generates a plurality of mixer-to-client hints 312a-312d corresponding to each of the client terminals 102a-102d, respectively, using a suitable key switch hint generating procedure.

The key switch hints generation procedure depends on the type of encryption scheme used. For example, in the case of an NTRU encryption scheme, the key switch hints may be generated by converting a ciphertext of degree of at most d, encrypted under a secret key f1, into a degree-1 ciphertext c2 encrypted under a secret key f2 (which may or may not be the same as f1). The "hint" may be $a12=m*f1\hat{\ }d*f2\hat{\ }-1$ mod q for a short m∈R congruent to 1 modulo p, where m=p*e+1 could be chosen for a Gaussian distributed e, or m is zero-centered (among other possible configurations). The key switch operation may then be defined as the function: KeySwitch(c1, a12): c2=a12*c1 mod q.

After generating the client-to-mixer hints 310a-310d, and the mixer-to-client hints 312a-312d, the trusted third party 300 transmits them to a central communication hub or mixer 314. Accordingly, in one embodiment, neither the mixer private key 308 nor the client private keys 202a-202d are shared with the mixer 314. Because the mixer private key 308 is not shared with the mixer 314, additional key switch hints cannot be generated that would allow delegation of decryption to another entity, thereby improving security and privacy of the communication session.

Figure 4:
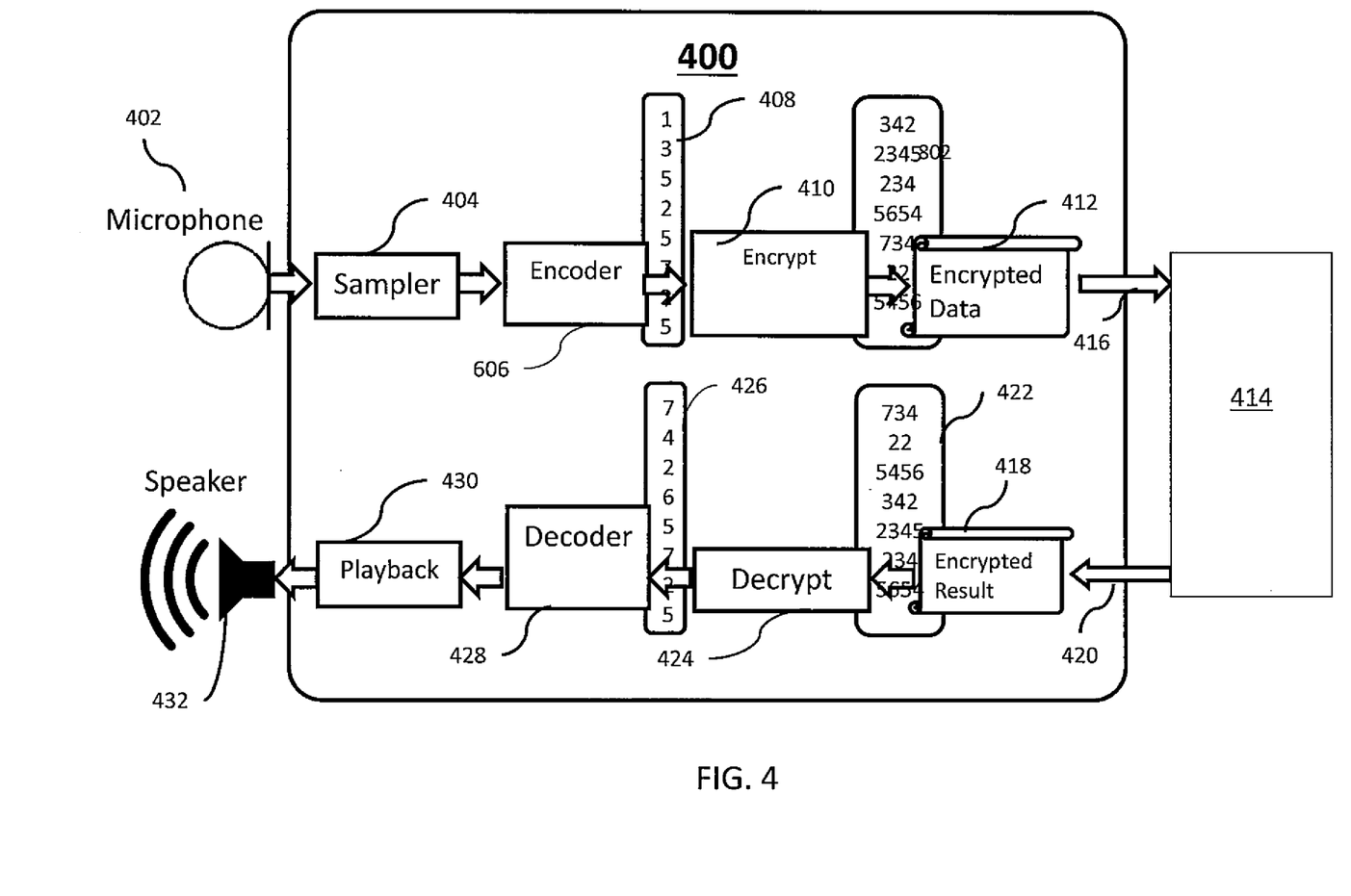
FIG. 4 illustrates a process of data encryption and decryption by clients within a distributed communication system, according to some embodiments of the present invention.

FIG. 4 shows data encryption and decryption by a client, according to some embodiments of the present invention. In the embodiment illustrated by FIG. 4, the communication session relates to voice conferencing, although embodiments of the present invention are not limited to voice conferencing. In some embodiments, the communication session may include video conferencing, text messaging or chat room conferencing, or any other communication session in which users utilize client systems to exchange communication data.

The client terminal (or client) 400 illustrated in FIG. 4 includes a microphone 402, for capturing analog audio (e.g., voice communications from a user of the client 400). The client 400 further includes a sampler 404 for sampling the analog audio signals at regular or predetermined intervals. The client 400 further includes a linear encoder 406 for converting the sampled analog audio signals into digital data 408. The digital data 408 may be represented as a vector of values representing each sampled value of the analog audio signal at each of the intervals during the course of a frame of audio. The digital data 408 may additionally group one or more frames of data into packets prior to encryption.

The client 400 further includes an encryption unit 410, configured to encrypt the digital data 408 according to the encryption mechanism or scheme of a distributed communication system. For example, the encryption unit 410 may utilize an additive homomorphic encryption scheme using the secret key of the client 400. The encryption unit 410 may be any suitable encryption unit, computer system, processor, or microprocessor capable of performing real-time data encryption of the digital data 408 according to the requirements of the distributed communication system. The encryption unit 410 generates an encrypted data stream 412 corresponding to the digital data 408 using a suitable encryption scheme or algorithm. The encrypted data stream 412 may be represented as a vector of values corresponding to each value of the digital data 408. The particular encryption scheme or algorithm may be agreed upon by each of the clients engaging in a communication session prior to initiating the communication session.

The client 400 is in electronic communication with the central communication hub or mixer 414 by way of communication channel 416, and transmits the encrypted data stream 412 to the mixer 414. The mixer 414 similarly receives encrypted data streams from a plurality of other clients, and combines the encrypted data streams to generate an encrypted result data stream 418.

The mixer 414 then provides the encrypted result data stream 418 back to the client 400 by way of communication channel 420. The encrypted result data stream 418 may be represented as a vector of values corresponding to the values of the vectors of the encrypted data streams of the clients. The encrypted result data stream 418 may include a combination of all of the encrypted data streams provided by all of the clients during the communication session, or may include only some of the encrypted data streams. For example, in some embodiments, a particular client may not receive their own encrypted data stream as part of the encrypted result data stream.

The client 400 further includes a decryption unit 424, which decrypts the encrypted result data stream 418 to generate a decrypted data stream 426, according to the encryption scheme agreed upon by the clients or according to the design and function of the distributed communication system. The client 400 further includes a decoder 428, which receives the decrypted data stream 426, and decodes the decrypted data stream 426 to an appropriate format. For example, the decoder 428 may decode the decrypted data stream 426 to an analog audio signal that can be played back using a player or playback unit 430 to the user of the client terminal 400 using a speaker 432 of the client terminal 400. In the case of non-voice data communication, the decoded data is send to a desired destination, without any play back.

In some embodiments, a NTRU algorithm is used as a representational additive homomorphic encryption scheme which provides encryption and decryption functions.

Figure 5:
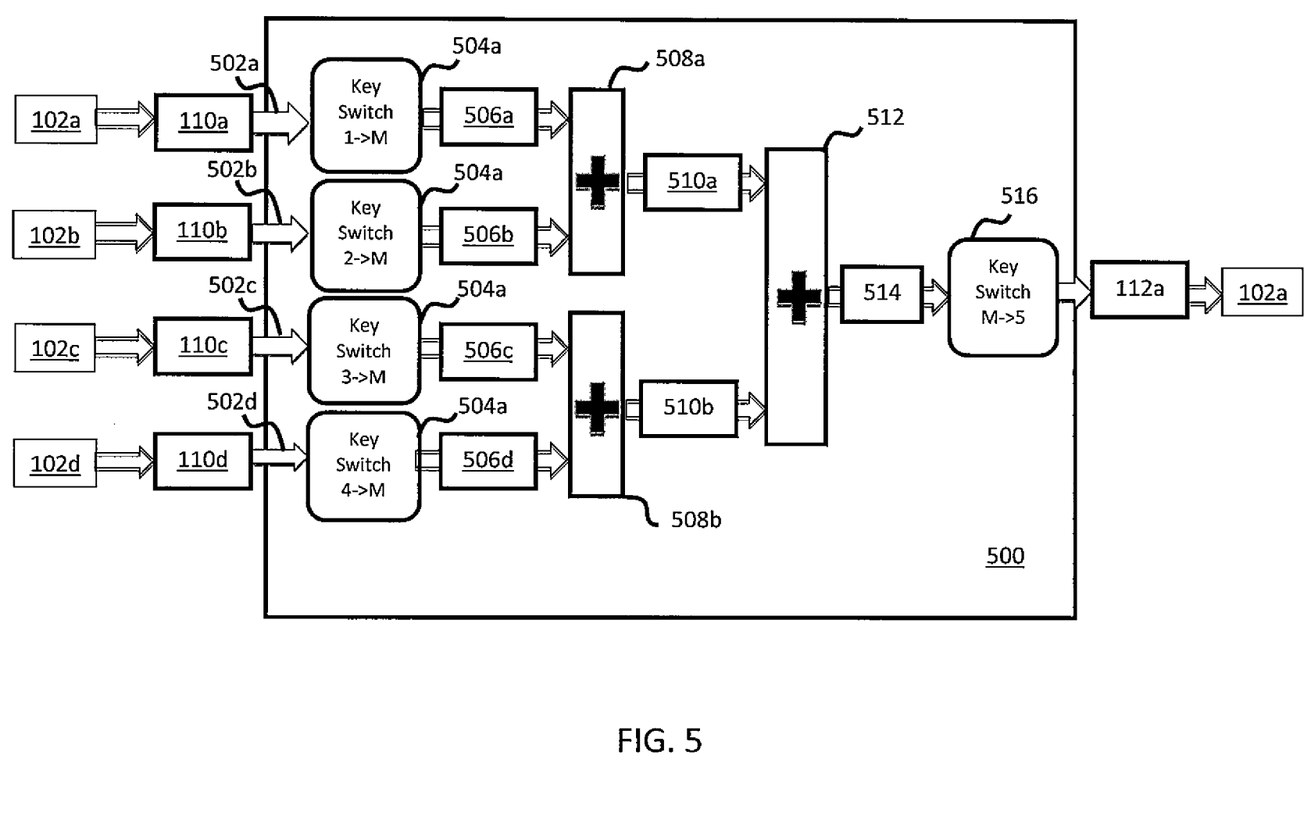
FIG. 5 illustrates an example operation of a central communication hub or mixer operating within the distributed communication system, according to some embodiments of the present invention.

FIG. 5 illustrates an example of a block diagram of a communication hub or mixer according to embodiments of the present invention. As shown in FIG. 5, the communication hub or mixer 500 receives the encrypted data streams 110a-110d from each of the client terminals 102a-102d, respectively, through mixer inputs 502a-502d. Next, one or more key switch circuits perform a key switch operation on the encrypted data streams 110a-110d using a corresponding mixer-to-client key switch hint. For example, a key switch circuit 504a of the mixer 500 performs a key switch operation on the encrypted data stream 110a received from the client terminal 102a using the corresponding client-to-mixer key switch hint received from a trusted third party to generate an encrypted data representation 506a.

The key switch operation may then be defined as the function: KeySwitch(c1, a12): $c2 = a12*c1 \mod q$. The input ciphertext c1 may be encrypted via some key f1 and the ciphertext may be represented, for example, as a vector of integers. The input key switch hint a12 may also be represented as a vector of integers and may be a hint which is used to switch ciphertexts encrypted under f1 to ciphertexts encrypted under f2. The key switch operation may include performing an element-wise multiplication of the input ciphertext and the input key switch hint, modulo an integer q which is pre-shared with the mixer. Thus, the output may be a ciphertext c2 which is an encryption of the data encrypted in c1, but accessible by a holder of the key f2.

Similarly, key switch circuits 504b-504d perform a key switch operation on each of the other respective encrypted data streams using the corresponding client-to-mixer key switch hints received from the trusted third party, to generate encrypted data representations 506b-506d corresponding to the client terminals 102b-102d, respectively. The key switch circuits 504a-504d may be separate components or the same component, and in one embodiment, the key switch circuits 504a-504d are part of a computer system or processor of the mixer 500.

The mixer 500 then combines or adds the encrypted data representations 506a-506d using a suitable summation scheme. For example, in one embodiment illustrated in FIG. 5, a summation of the encrypted data representations 506a-506d may be performed in a tree fashion, in which the encrypted data representation 506a is combined with the encrypted data representation 506b using an adder 508a to generate a combined data set 510a, and the encrypted data representation 506c is combined with the encrypted data representation 506d using an adder 508b to generate a combined data set 510b. Next, the combined data set 510a is mixed with the combined data set 510b using an adder 512 to generate a composite data set 514.

The addition process may be represented, for example, by the equation Addition(c',c): $c'' = c' + c \mod q$ where two input ciphertexts of the same dimension c' and c are represented as equal-length integer vectors. The output is the ciphertext c'' which is the element-wise addition of c' and c, mod an integer q which is pre-supplied to the mixer. This process may be repeated for every addition step in the mixer.

The composite data set 514 is then provided to a key switch circuit 516 of the mixer 500 to perform a second switching operation on the composite data set 514 to generate an encrypted result data stream 112a using the mixer-to-client key switch hint 210a. The encrypted result data stream 112a is then transmitted to the client terminal 102a, where the encrypted result data stream 112a can be decrypted using the client private key 202a.

The above process is also performed for each of the other client terminals 102b-102d, such that each of the client terminals 102a-102d receives an encrypted result data stream 112a-112d, respectively, which are a composite of the encrypted data streams 110a-110d. In the embodiments illustrated in FIG. 5, encrypted result data stream 112a provided to the recipient client terminal 102a includes the encrypted data stream 110a. Thus, the mixer 500 receives encrypted input data from each of the client terminals and provides a common output.

In some embodiments, the encrypted result data stream 112a may include a composite of only the encrypted data streams 110b-110d, such that the client terminal 102a does not receive its own encrypted data stream 110a as part of the encrypted result data stream 112a. In general, in a representational communication system having a plurality of client terminals c1-cm, a client terminal ci would receive, in the encrypted result data stream, the encrypted data streams of the client terminals $c1+c2+ \ldots +ci-1+ci+1+ \ldots + cm$. The summation of the encrypted data streams of each of the client terminals, switched using the client to mixer hints, can be performed in a tree fashion as illustrated in FIG. 5, or using any other suitable addition scheme such as adding the ciphertexts consecutively in a running encrypted summation.

As illustrated in FIG. 5, each of the encrypted data streams are switched using a client-to-mixer hint upon receipt by the mixer. A different hint is used for each client terminal, where every client-to-mixer switch uses a unique client-to-mixer key switch hint. Each of the encrypted data streams or ciphertexts are vectorized into blocks of data, and a summation of the encrypted data streams is performed according to the design and function of the distributed communication system. In one embodiment, the additions are performed modulo some q pre-specified by the key generator of the trusted third party. The resulting ciphertext (e.g., the composite data set 514), is then switched to a representation that can be decrypted, decoded, and hosted (e.g., played back) by the intended client.

Figure 6A:
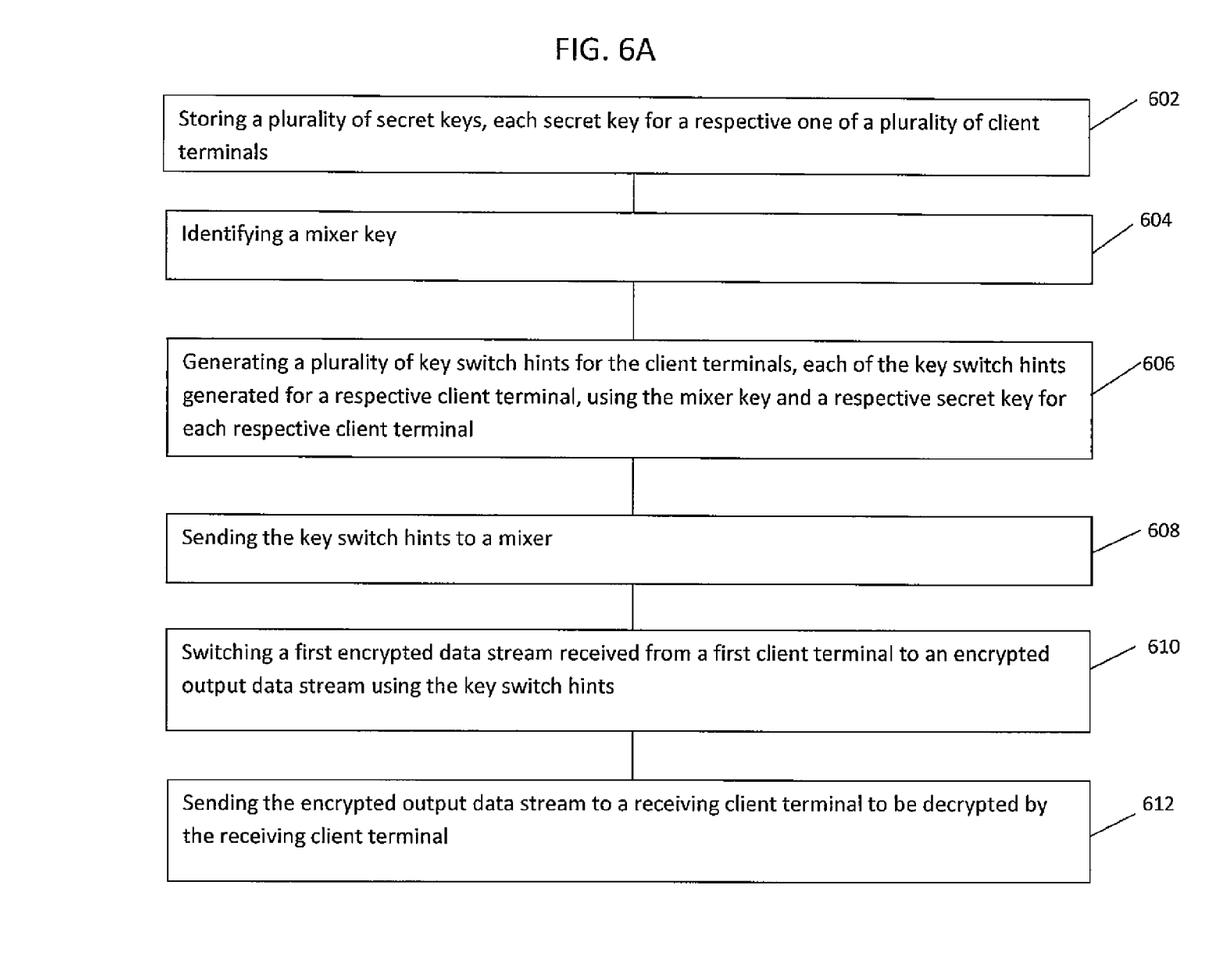
FIGS. 6A-6B illustrate an example of process flows, according to some embodiments of the present invention.

FIGS. 6A and 6B illustrate example process flows according to some embodiments of the present invention. In FIG. 6A, an example process flow of a computer implemented method for data privacy in a distributed communication system is shown. In block 602, a plurality of secret keys are stored, where each secret key is for a respective one of a plurality of client terminals. In block 604, a mixer key is identified. In block 606, a plurality of key switch hints for the client terminals are generated, wherein each of the key switch hints is generated for a respective client terminal using the mixer key and a respective secret key for each respective client terminal. In block 608, the key switch hints are sent to a mixer. In block 610, a first encrypted data stream received from a first client terminal is switched to an encrypted output data stream using the key switch hints. In block 612, the encrypted output data stream is sent to a receiving client terminal to be decrypted by the receiving client terminal.

Figure 6B:
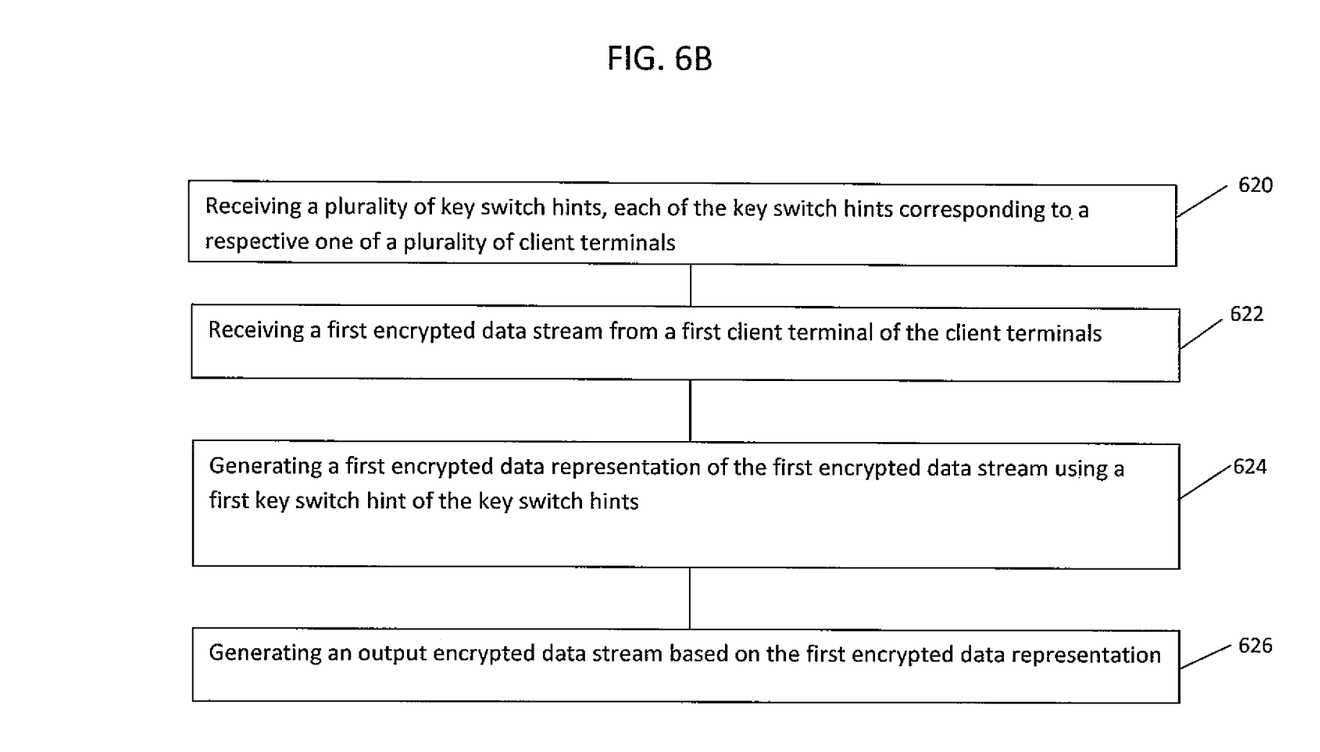

In FIG. 6B, another example process flow of a computer implemented method for data privacy in a distributed communication system is shown. In block 620, a plurality of key switch hints are received, wherein each of the key switch hints correspond to a respective one of a plurality of client terminals. In block 622, a first encrypted data stream is received from a first client terminal of the client terminals. In block 624, a first encrypted data representation of the first encrypted data stream is generated using a first key switch hint of the key switch hints. In block 626, an output encrypted data stream is generated based on the first encrypted data representation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for data privacy in a distributed communication system, the method comprising:
   storing a plurality of secret keys, each secret key for a respective one of a plurality of client terminals;
   identifying a mixer key;
   generating a plurality of key switch hints for the client terminals, each of the key switch hints generated for a respective client terminal of the client terminals, using the mixer key and a respective secret key for each respective client terminal;
   sending the key switch hints to a mixer;
   switching a first encrypted data stream received from a first client terminal of the client terminals to an encrypted output data stream using the key switch hints; and
   sending the encrypted output data stream to a receiving client terminal of the client terminals to be decrypted by the receiving client terminal.

2. The method of claim 1, wherein the key switch hints further comprise:
   a plurality of client-to-mixer hints; and
   a plurality of mixer-to-client hints, wherein each of the client-to-mixer hints and each of the mixer-to-client hints is associated with one of the client terminals.

3. The method of claim 1, further comprising:
   switching the first encrypted data stream received from the first client terminal to a first encrypted data representation using a first key switch hint of the key switch hints;
   switching a second encrypted data stream received from a second client terminal to a second encrypted data representation using a second key switch hint of the key switch hints; and
   generating a third encrypted data representation based on the first encrypted data representation and the second encrypted data representation.

4. The method of claim 3, further comprising:
   generating the output encrypted data stream based on the third encrypted data representation using a third key switch hint of the key switch hints.

5. The method of claim 1, wherein the receiving client terminal is one of the plurality of client terminals.

6. The method of claim 1, further comprising:
   switching the first encrypted data stream received from the first client terminal to a first encrypted data representation using a first key switch hint of the plurality of key switch hints;
   switching a second encrypted data stream received from a second client terminal to a second encrypted data representation using a second key switch hint of the plurality of key switch hints; and
   combining the first encrypted data stream and the second encrypted data stream to generate a composite data stream.

7. The method of claim 6, further comprising switching the composite data stream to the encrypted output data stream using a key switch hint of the plurality of key switch hints corresponding to the receiving client terminal.

8. A computer implemented method for data privacy in a distributed communication system, the method comprising:
   receiving a plurality of key switch hints, each of the plurality of key switch hints corresponding to a respective one of a plurality of client terminals;
   receiving a first encrypted data stream from a first client terminal of the client terminals;

switching the first encrypted data stream using a first key switch hint of the plurality of key switch hints to generate a first encrypted data representation of the first encrypted data stream; and generating an encrypted output data stream based on the first encrypted data representation.

9. The method of claim 8, further comprising:

receiving a second encrypted data stream from a second client terminal of the client terminals;

switching the second encrypted data stream using a second key switch hint of the plurality of key switch hints to generate a second encrypted data representation of the second encrypted data stream; and generating the encrypted output data stream based on the first encrypted data representation and the second encrypted data representation.

10. The method of claim 9, wherein generating the encrypted output data stream further comprises:

generating a third encrypted data representation based on the first encrypted data representation and the second encrypted data representation; and generating the output encrypted data stream based on the third encrypted data representation and a third key switch hint of the key switch hints.

11. The method of claim 9, wherein generating the encrypted output data stream further comprises combining the first encrypted data stream with the second encrypted data stream to generate a composite data stream.

12. The method of claim 11, wherein generating the encrypted output data stream further comprises switching the composite data stream to the output encrypted data stream using a key switch hint of the plurality of key switch hints corresponding to a recipient client terminal of the client terminals.

13. The method of claim 8, further comprising receiving the plurality of key switch hints from a trusted third party, wherein the key switch hints are generated based on a respective client private key of each of the client terminals and a mixer private key of the trusted third party.

14. A distributed communication system comprising a plurality of client terminals communicating through a communication hub, the communication hub comprising:

an input port for receiving a plurality of key switch hints and a plurality of encrypted data streams, wherein each of the key switch hints and each of the encrypted data streams correspond to a respective one of the client terminals;

a first switching circuit coupled to the input port for generating an encrypted data representation of each of the encrypted data streams using a corresponding one of the key switch hints; and an output terminal coupled to the switching circuit for generating output encrypted data streams based on the encrypted data representation of each of the encrypted data streams.

15. The distributed communication system of claim 14, wherein the communication hub further comprises one or more adders for combining the encrypted data representation of each of the encrypted data streams to generate a composite data set.

16. The distributed communication system of claim 15, wherein the communication hub further comprises a second switching circuit coupled to the one or more adders for generating the output data stream using the composite data set and one of the key switch hints.

17. The distributed communication system of claim 14, wherein the plurality of key switch hints further comprises:

a plurality of client-to-mixer hints each corresponding to the respective one of the client terminals; and a plurality of mixer-to-client hints each corresponding to the respective one of the client terminals.

18. The distributed communication system of claim 14, further comprising a trusted third party, wherein the trusted third party comprises:

a plurality of input terminals for receiving a respective client secret key from each of the client terminals;

a key generator for generating a mixer private key, wherein the trusted third party is configured to generate the key switch hints based on the respective client secret key from each of the client terminals and the mixer private key; and an output terminal for providing the key switch hints to the communication hub.

19. The distributed communication system of claim 18, wherein the each of the client terminals comprises a decryption circuit for decrypting the output encrypted data stream using the respective client secret key.

20. The distributed communication system of claim 18, wherein the each of the client terminals comprises an encryption circuit for encrypting digital data using the respective client secret key.

* * * * *